United States Patent [19]

Allen

[11] Patent Number: 5,205,173

[45] Date of Patent: Apr. 27, 1993

[54] METHOD AND APPARATUS FOR DETECTING LEAKS IN PIPELINES USING CROSS-CORRELATION TECHNIQUES

[75] Inventor: Trevor J. Allen, Hopton-on-Sea, England

[73] Assignee: Palmer Environmental Services, England

[21] Appl. No.: 718,746

[22] Filed: Jun. 21, 1991

[51] Int. Cl.$^5$ ............................................. G01M 3/00
[52] U.S. Cl. ................................... 73/592; 73/40.5 A
[58] Field of Search ............................ 73/40.5 A, 592; 340/605; 376/252

[56] References Cited

U.S. PATENT DOCUMENTS

| | | |
|---|---|---|
| Re. 28,686 | 1/1976 | Coulthard ........................ 73/194 E |
| 1,738,094 | 12/1929 | Caldwell et al. . |
| 1,886,914 | 11/1932 | Slichter . |
| 2,170,487 | 8/1939 | Soler . |
| 2,253,975 | 8/1941 | Guanella . |
| 2,416,336 | 2/1947 | Marchand . |
| 2,420,439 | 5/1947 | Morrison . |
| 2,629,827 | 2/1953 | Eckert et al. . |
| 2,643,819 | 6/1953 | Lee et al. . |
| 2,688,124 | 8/1954 | Doty et al. . |
| 2,884,624 | 4/1959 | Dean et al. . |
| 2,940,302 | 6/1960 | Scherbatskoy . |
| 2,982,942 | 5/1961 | White . |
| 2,989,726 | 6/1961 | Crawford et al. . |
| 3,106,705 | 10/1963 | Schimmel et al. . |
| 3,121,955 | 2/1964 | King . |
| 3,158,830 | 11/1964 | Clay . |
| 3,168,824 | 2/1965 | Florer et al. . |
| 3,228,232 | 1/1966 | Proctor . |
| 3,249,911 | 5/1966 | Gustafsson . |
| 3,274,541 | 9/1966 | Embree . |
| 3,284,763 | 11/1966 | Burg et al. . |
| 3,297,981 | 1/1967 | Harney et al. . |
| 3,307,145 | 2/1967 | Dunster et al. . |
| 3,344,407 | 9/1967 | Koeijmans et al. . |
| 3,376,557 | 4/1968 | Godinez . |
| 3,441,745 | 4/1969 | Reeves et al. . |
| 3,466,949 | 5/1969 | Trimble . |
| 3,478,576 | 11/1969 | Bogle . |
| 3,504,164 | 3/1970 | Farrell et al. . |
| 3,506,813 | 4/1970 | Trimble . |
| 3,517,546 | 6/1970 | Fraser . |
| 3,524,169 | 8/1970 | McAuliffe et al. . |
| 3,548,383 | 12/1970 | Blitz et al. . |
| 3,595,078 | 7/1971 | Beck . |
| 3,626,750 | 12/1971 | Talmon . |
| 3,688,249 | 8/1972 | Backus et al. . |

(List continued on next page.)

FOREIGN PATENT DOCUMENTS

| | | |
|---|---|---|
| 4318600 | 6/1964 | Japan . |
| 1426943 | 3/1976 | United Kingdom . |

OTHER PUBLICATIONS

Fuchs et al., "Ten Years of Experience with Leak Detection by Acoustic Signal Analysis", Fraunhofer Institut fur Bauphysik Stuttgart (1990??).

Institute of Water Engineers, "Symposium on Waste Control: its Importance in the Planning and Management of Water Supply Systems" (1974), pp. 136–138.

Honeywell, Signal Analysis Operation Test Instr. Div.; "Correlation and Probability Analyzer Model SAI-42" (Nov. 1972); pp. 1-1 to 4-29.

(List continued on next page.)

Primary Examiner—Hezron E. Williams
Assistant Examiner—Nashmiya Ashraf
Attorney, Agent, or Firm—Rosenblum, Parish & Isaacs

[57] ABSTRACT

An improved method and apparatus for detecting leaks in pipelines using cross-correlation techniques including improved correlating circuitry featuring a pair of circulating delay lines for respectively receiving, temporarily storing and processing in a revolving sequence samples of input data obtained from a pair of remotely positioned sensors, a multiplying circuit for causing samples input to each channel to be multiplied by each sample stored in the circulating delay line associated with the other channel, an adder and accumulator memory for accumulating the multiplication results, and a display for displaying the correlation results.

9 Claims, 5 Drawing Sheets

U.S. PATENT DOCUMENTS

| | | |
|---|---|---|
| 3,720,789 | 3/1973 | Clark . |
| 3,744,298 | 7/1973 | Flourney et al. .................. 73/40.5 A |
| 3,756,275 | 9/1973 | Barrera .................................. 137/590 |
| 3,811,111 | 5/1974 | Barbier et al. . |
| 3,814,207 | 6/1974 | Kusuda et al. . |
| 3,838,593 | 10/1974 | Thompson ........................ 73/40.5 A |
| 3,866,174 | 2/1975 | Barbier ............................. 340/155 A |
| 3,878,381 | 4/1975 | Broder et al. . |
| 3,903,729 | 9/1975 | Covington ........................ 73/40.5 R |
| 3,947,803 | 3/1976 | Brown ................................. 340/6 R |
| 3,955,404 | 5/1976 | Bickel et al. . |
| 3,961,203 | 6/1976 | Hutch .................................... 307/236 |
| 4,083,229 | 4/1978 | Anway ............................... 73/40.5 A |
| 4,289,019 | 9/1981 | Claytor ............................... 73/40.5 A |
| 4,327,576 | 5/1982 | Dickey et al. .................... 73/40.5 A |
| 4,435,974 | 3/1984 | Fuchs et al. ...................... 73/40.5 A |
| 4,858,462 | 8/1989 | Coulter et al. ................... 73/40.5 A |
| 5,038,614 | 8/1991 | Bseisu et al. ..................... 73/40.5 A |

OTHER PUBLICATIONS

Ono et al., "Application of Correlation Analysis to Acoustic Emission", UCLA-Eng. 7202 (Jan. 1972).

Crawford, "Culvert Whistlers", AJP vol. 39 (Jun. 1971), pp. 610–615.

Hewlett-Packard, "Service Manual (vol. 1) Model 3721A Correlator" (May 1971), pp. 1-2 to 1-7.

Hewlett Packard; "Operating Manual Model 3721A Correlator"(Apr. 1971), pp. 3–12.

Mann et al. "Data Analysis and Correlation with Digital Computers Nondestructive Testing (Final Report)", Div. of Engr. Research, Louisiana State Univ. (1971) Engr. Res. Bulletin 107.

Hewlett Packard Journal, vol. 21, No. 3 (Nov. 1969), p. 2.

Smith, "Electronic Digital Computers" (1959), pp. 179–196.

METHOD AND APPARATUS FOR DETECTING LEAKS IN PIPELINES USING CROSS-CORRELATION TECHNIQUES

BACKGROUND OF THE INVENTION

1. Field of the Invention

The present invention relates generally to pipeline leak detection methods and apparatus, and more particularly to an improved method and apparatus for quickly and accurately locating the source of a leak in a pipeline utilizing improved cross-correlation techniques which allow the entire length of pipe between two sensors to be scanned without requiring use of a fixed delay or reversal of sensor inputs.

2. Brief Description of the Prior Art

It has long been known that water or any other fluid escaping from a pressurized pipe produces a characteristic noise which is propagated along the pipe with a constant velocity in both directions away from the leak location. It is likewise known that by placing sensors on opposite sides of the leak, the leak noise will be received at different times depending upon the distance of each sensor from the leak. Since the propagating velocity can easily be determined the location of the leak can be determined as a function of the time difference. In the U.S. Pat. No. 4,083,229 to Alan Anway, a cross-correlation measurement technique is disclosed wherein one signal is progressively delayed relative to the other while the apparatus continues to compare the similarity between the two signals. This enables the device to measure the difference in travel time $T_d$ of the leak noise to the respective sensors. By determining the velocity of sound for the particular piperline under test and using the distance between the sensors, the apparatus can compute the leak position in accordance with the following formula:

$$L = [D - (V \times T_d)]/2$$

where L is the leak position, D is the overall distance between the sensors, V is the velocity of sound in the pipeline medium, and $T_d$ is the transit time difference.

One of the problems associated with such prior art correlation techniques is that, in order to scan the entire length of the pipe between the two sensors, a fixed delay must be introduced into one of the input data streams, or means must be provided for switching the device inputs. Not only does this add additional complexity to the apparatus, but it also means that a certain delay is introduced into the operational function before meaningful data can be accumulated.

SUMMARY OF THE PRESENT INVENTION

It is therefore an object of the present invention to provide an improved method and apparatus for analyzing leak detector signals obtained from positions on opposite sides of a leak location to determine with a high degree of precision the location of the leak.

Another object of the invention is to provide an improved correlation device and method of the type described wherein the inputs from each of two detectors are simultaneously recirculated and compared to each other.

Still another object of the present invention is to provide an improved leak detection apparatus of the, type described including the use of circulating delay lines in each input leg.

Briefly, a presently preferred embodiment of the present invention includes improved correlating circuitry featuring a pair of circulating delay lines for respectively receiving, temporarily storing and processing in a revolving sequence samples of input data obtained from a pair of remotely positioned sensors, a multiplying circuit for causing samples input to each channel to be multiplied by each sample stored in the circulating delay line associated with the other channel, an adder and accumulator memory for accumulating the multiplication results, and a display for displaying the correlation results.

An important advantage of the present invention is that the entire length of pipe between sensors can be scanned on a real-time basis.

Another advantage of the present invention is that a user begins to obtain useful information almost immediately after the scanning operation is commenced.

Yet another advantage of the present invention is that it can be implemented in a more efficient and less expensive manner than has heretofore been possible.

These and other objects and advantages of the present invention will no doubt become apparent to those skilled in the art after having read the following detailed description of the preferred embodiment which is illustrated in the drawing.

IN THE DRAWING

DESCRIPTION OF THE PREFERRED EMBODIMENT

Figure 1:
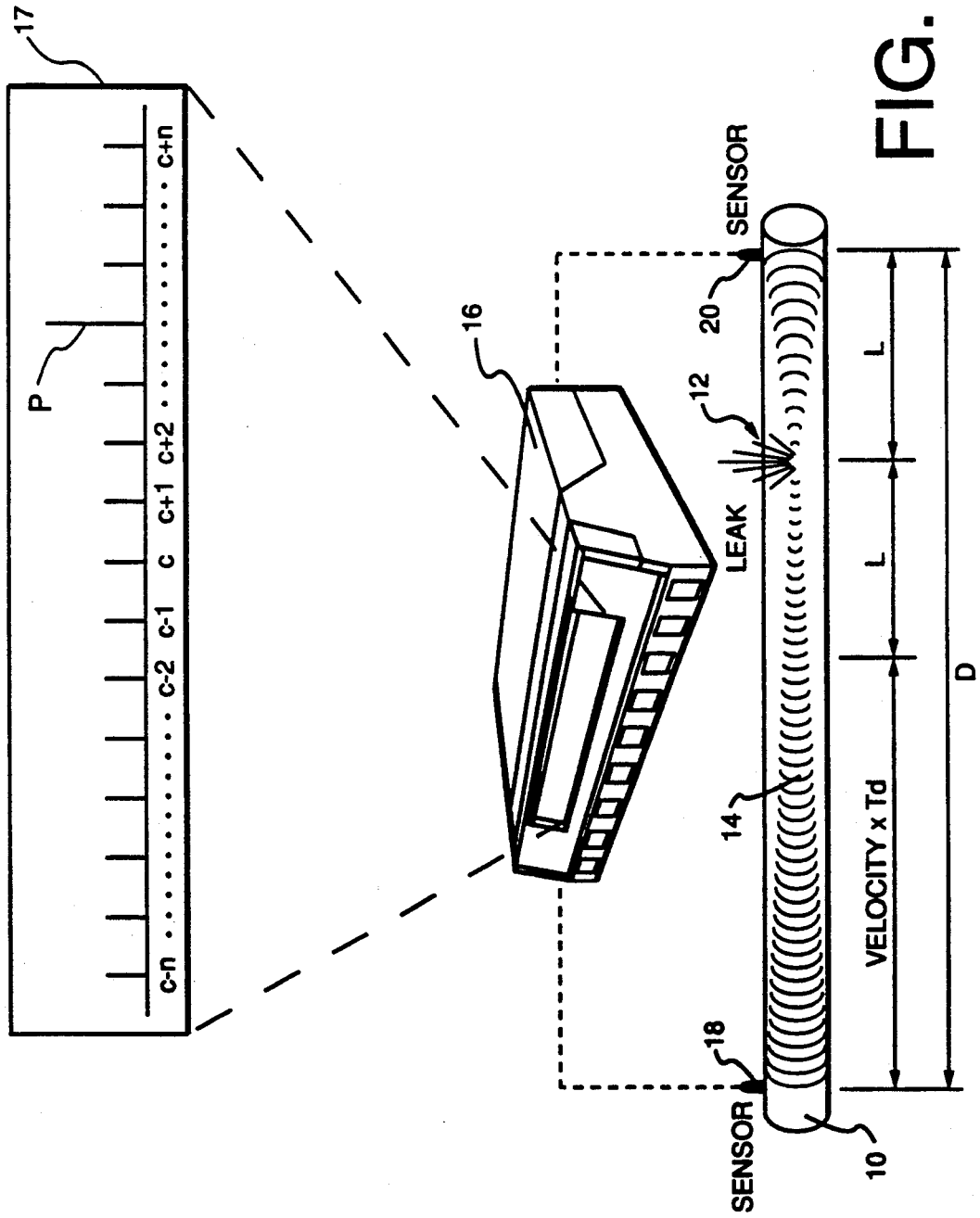
FIG. 1 is a diagram generally illustrating operation of a leak detector apparatus in accordance with the present invention.

Referring now to FIG. 1 of the drawing, there is shown at 10 a section of pipe suspected of having a leak located at some unknown position 12. The waves 14 are intended to illustrate movement of sound from the leak toward each end of the pipe 10. In order to detect the position of the leak relative to the length of pipe, a detection system depicted at 16 utilizes correlation techniques to determine the difference in time it takes for sound originating at the source 12 to arrive at the locations of two sensors 18 and 20 placed at a known distance D apart on opposite sides of the leak. As indicated above, the transit time difference $T_d$ can then be used to locate the leak relative to one of the sensors by solving the equation $L = [D - (V \times T_d)]/2$. As will be further explained below, data accumulated at correlation points related to the display centerpoint "C" will locate the leak, as indicated by the pulse "P" on the system display depicted in enlarged form at 17. Note that the signal correlation results at other points along the length of pipe are also shown at "n" points on each side of the centerpoint "C".

Figure 2A:
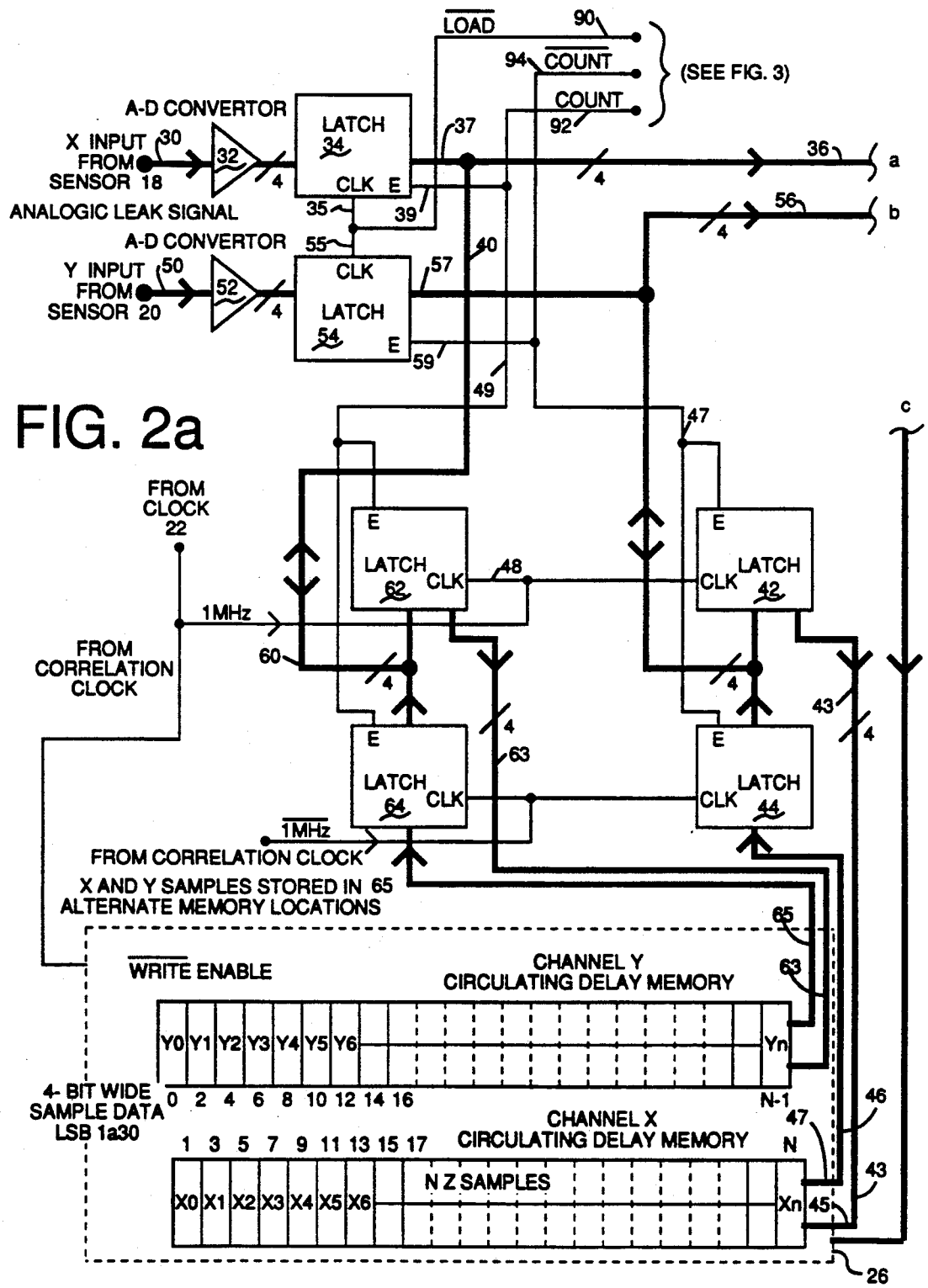
FIGS. 2a and 2b show block diagrams schematically illustrating a preferred embodiment of the present invention.
Figure 2B:
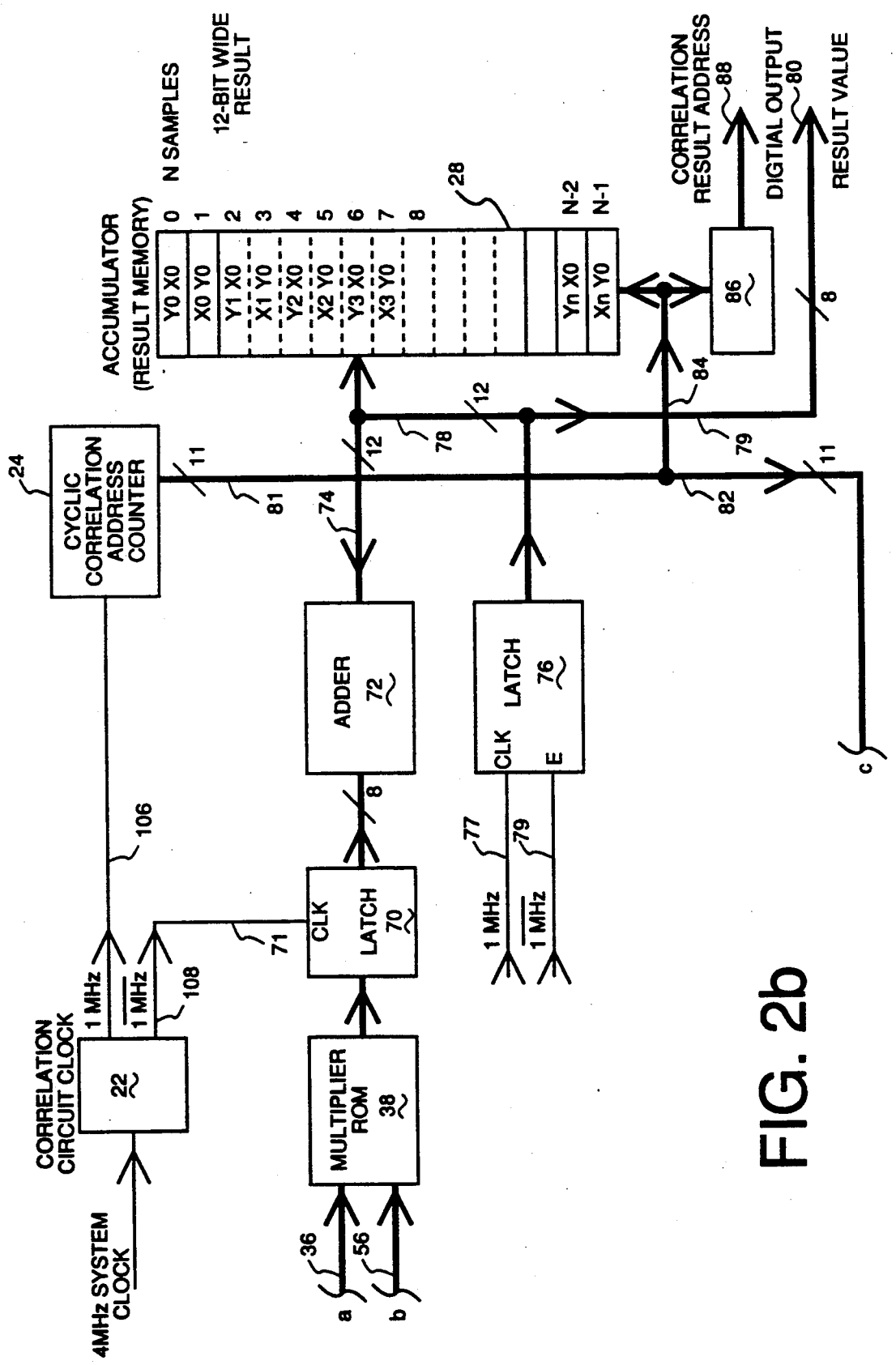

Turning now to FIG. 2 of the drawing, the principal functional components of the correlation circuit of the present system are illustrated. More particularly, the circuit includes a correlation system clock 22, a cyclic correlation address counter 24, a dual channel circulating delay memory unit 26, and an accumulator or result memory 28.

An X-input channel receiving inputs from a sensor 18 begins with an analog signal input terminal 30 and extends through an analog-to-4-bit-digital converter 32 and latch 34 to one input 36 of a digital signal multiplier 38. An alternate bi-directional 4-bit signal path 40 also extends from multiplier input 36 to the junction between the input to a latch 42 and the output from a latch 44. A 4-bit signal path 43 extends from the output of latch 42 to the input 45 of an X-channel delay memory 26. A return path 46 extends from the output port 47 of the X-channel delay memory 26 to the input side of latch 44. Signals returning from delay memory 26 follow path 46 through latch 44 and path 40 to multiplier input 36.

A Y-input channel receiving an analog input from sensor 20 begins with a terminal 50 and passes through an A-to-D converter 52 and latch 54 to a second input 56 of multiplier 38. An alternate bi-directional signal path 60 connects the output of latch 54 (and multiplier input 56) to the junction between latches 62 and 64. The output of latch 62 is coupled to the Y-channel of circulating delay memory 26 via line 63. A return path for Y-channel data is provided via line 65 through latch 64 and line 60 to the input 56 of multiplier 38.

The output of multiplier 38, which may be configured as a look-up ROM, is latched by a latch 70 for input to an adder 72 which adds the new information developed by multiplier 38 to old information stored at an addressed location in result memory 28 and input to adder 72 on line 74. The output of adder 72 is latched by a latch 76 for return to result memory 28 via line 78 or alternatively, to be made available via line 79 as a result value at an output terminal 80. Input and output to and from memories 26 and 28 is controlled by the address counter 24 via address signals developed on lines 81, 82 and 84. A current address in memory 28 may be latched by latch 86 for output as a correlation result address at an output terminal 88.

Sample data is input to latches 34 and 54 in response to $\overline{\text{LOAD}}$ signals developed on line 90 and applied at CLK inputs 35 and 55 respectively. Latched signals are output from latches 34 and 54 at ports 37 and 57 in response to COUNT and $\overline{\text{COUNT}}$ signals applied to the enable inputs 39 and 59 respectively. Similarly, data is input to latches 42 and 62, and 44 and 64, in response to 1 MHz CLK signals developed by clock 22 on lines 43 and 45. These latches have their outputs enabled by COUNT signals input on lines 47 and 49. Various inhibit signals are also generated for use during sample input but for simplicity are not shown.

Operation of latch 70 is controlled by a CLK input at 71. Latch 76 is controlled by a CLK input at 77 and an enable input at 79.

Figure 3:
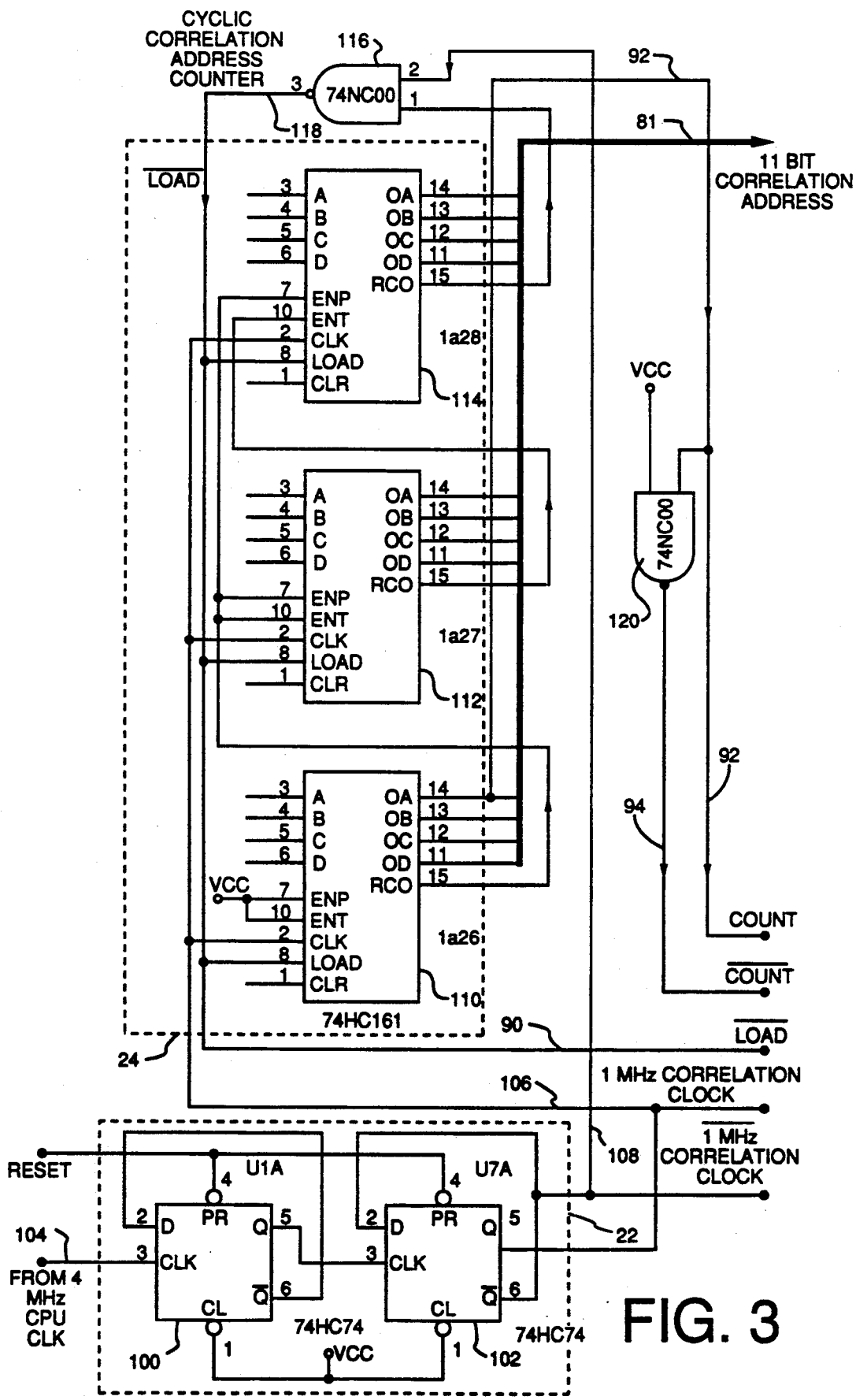
FIG. 3 is a diagram schematically illustrating the basic components of the system clock and correlation address counter depicted in FIG. 2 of the drawing.

Turning now to FIG. 3 of the drawing, details of the correlation clock 22 and correlation address counter 24 are depicted As illustrated, clock 22 is comprised of a pair of integrated circuit flip-flop devices 100 and 102 interconnected to provide a "divide-by-four" function converting the 4 MHz CPU clock input at 104 into 1 MHz correlation clock signals CLK and $\overline{\text{CLK}}$ for output on lines 106 and 108 respectively.

Address counter 24 is comprised of three integrated circuit counters 110, 112 and 114 interconnected to jointly act as an eleven-bit counting circuit. The signal generated on line 108 is input to one input of a NAND-gate 116 to generate the $\overline{\text{LOAD}}$ output on line 118. The output from the RCO (Ripple Carry Out) pin of chip 114 is used to generate the LOAD signal. The RCO signal is gated with the IMHz clock signal in gate 1 16 to ensure that the $\overline{\text{LOAD}}$ signal is present on the LOAD inputs of chips 110, 112, 114 when the leading edge of the IMHz clock on the clock input is used to preset the counter chips 110, 112, 114 to a value presented on the A, B, C, D pins of each chip. The counters count from this preset value to 7FF, generate the next RCO signal and hence, $\overline{\text{LOAD}}$ and thus continuously cycle. This cycle count is the correlation address.

The eleven-bit correlation address is output on bus 81. A second NAND-gate 120 responds to an input of the count signal on line 92, which is the least significant bit of the output of counter 110, and generates the $\overline{\text{COUNT}}$ output on line 94.

Figure 4:
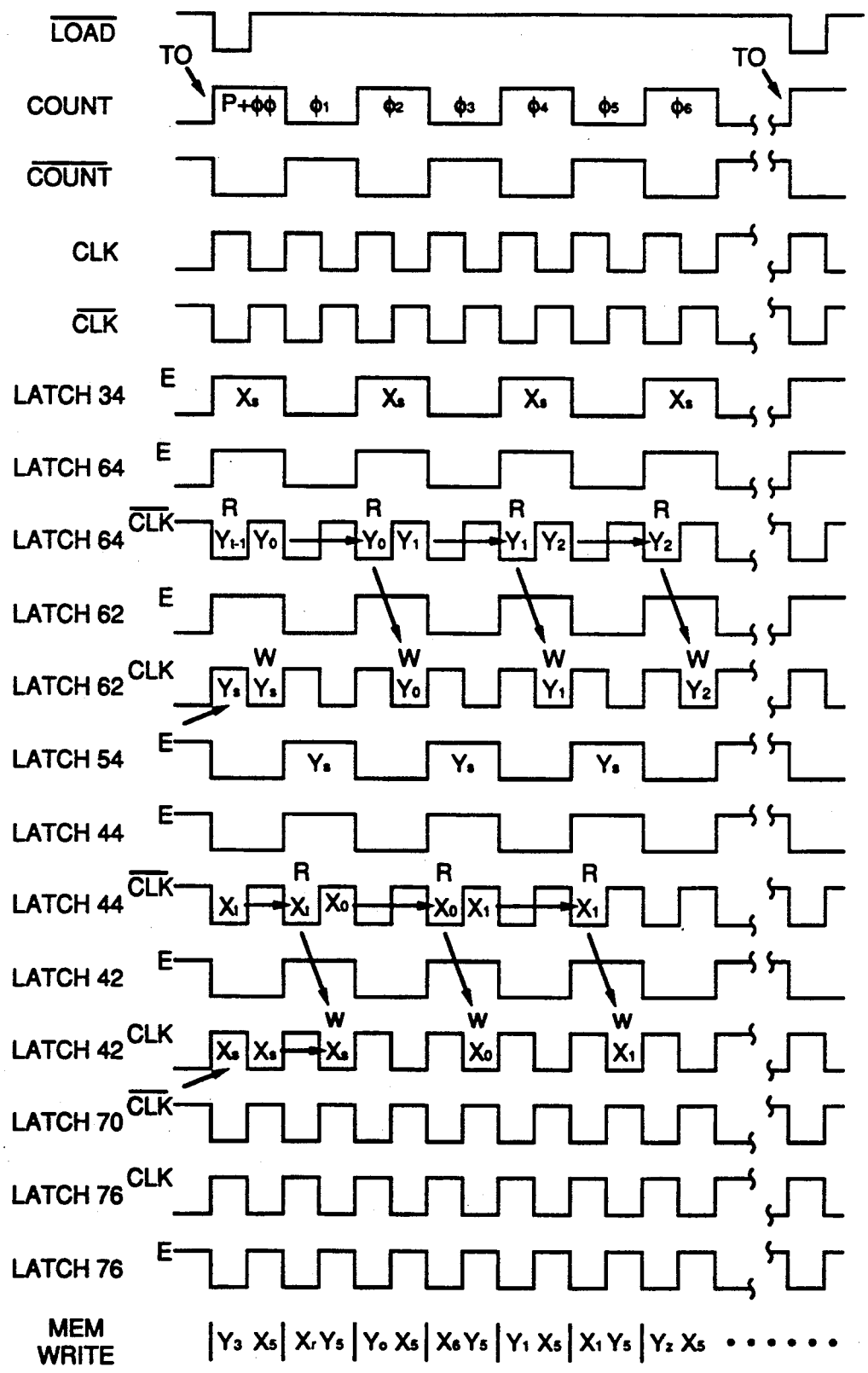
FIG. 4 is a timing diagram illustrating operation of the preferred embodiment.

In operation, and referring additionally to FIG. 4, an internally generated $\overline{\text{LOAD}}$ pulse input at 90 from source 116 (FIG. 3) causes latches 34 and 54 to simultaneously latch four-digital bits of sample data ($X_S$ and $Y_S$) generated by each of the converters 32 and 52. The internal correlation counter 24 then counts from a particular count value (preselected depending on pipe length, size, material and selected range) to a terminal count $T_c$ and then resets, at the same time generating the $\overline{\text{LOAD}}$ pulse on input 90. This enables the length of the static RAM (SRAM) delay line 26 to be varied for optimum length.

The least significant bit of the binary correlation count is used to generate the "COUNT" and "e,ovs/-COUNT/ " generated on lines 92 and 94 respectively. These signals are used as control signals to select one of two similar latch/sample memory blocks in an alternating fashion. One of the blocks is made up of latches 34, 62 and 64, and the Y-channel of memory 26. The other block is made up of latches 54, 42 and 44, and the X-channel of memory 26.

Addressing of the sample memory 26 and result memory 28 is directly driven by the 11-bit outputs generated by correlation counter 24 on lines 82 and 84. Although memories 26 and 28 are shown as discrete elements, for convenience, both memory blocks are contained within a common SRAM so that each discrete address has a 16-bit memory site occupied by a 4-bit Y- or X-sample value and a 12-bit correlation result stored in it. The effect of this addressing technique is that, as depicted in FIG. 2, all of the results for one side of the pipe, i.e., from the midpoint to one of the sensors, are stored in the odd-numbered memory addresses of memory (26, 28), and the results for the other side of the pipe are stored in the even-numbered memory addresses.

The latched samples in latches 34 and 54 are alternately enabled by the least significant bit of the correlation count so that in one count the new X-sample ($X_S$) in latch 34 is multiplied by the sample taken out of the previous address in the Y-sample memory previously latched into latch 64, or the new Y-sample ($Y_S$) latched into latch 54 by the load pulse. The resulting product generated by multiplier 38 is then latched by latch 10 and added by adder 72 to the results stored at the same address in memory 28, and the sample used to form the results is returned to memory 26 for storage at the same address via line 62. In the next count the new Y-sample ($Y_S$) in latch 54 is enabled for multiplication by the previous X-sample in memory or the new X-sample latched into latch 34 by the load pulse. This product is likewise added to the result at the same address in memory 28, and the X-sample is put back into sample memory 26 at the same address via latch 42.

The latched sample values in latches 34 and 54 are held as constants $X_S$ and $Y_S$ for one entire loop of the correlation counter 24 from preset value to terminal count. A $\overline{LOAD}$ pulse is then generated which latches another new set of sample values into latches 34 and 54. This is repeated for every loop of the correlation counter. On each even count output by the counter the sample value that was stored in the RAM location of the previous even count is multiplied in multiplier 38 by the $Y_S$ constant for that loop and then exchanged with the sample value at the current count. Similarly, on each odd count the sample value for the previous odd RAM location is multiplied by the $X_S$ constant for that loop then exchanged with the sample in the current odd count RAM location.

The products are stored in the current odd or even locations. This means that the sample values in the delay memory move along one odd or even place for each loop of the counter, but the results remain at the same odd or even RAM location and represent a correlation result for one-half of the pipe shifted in time relative to the other half.

At the preset location of the counter when the load pulse is generated, the new sample values take the place of the previous odd or even RAM sample values and get multiplied and swapped into the delay memory in place of the previous values, so that the oldest odd and even samples get discarded each loop of the counter. If the sample delay memory is 256 samples long, the length of the pipe being represented by the result in RAM is 256*256 time delay units long.

In this embodiment the results interlaced in memory are read out as required for a display of results with "0" delay in the center to show leak positions either side of the centerpoint "C" (see FIG. 1) using a hardware look-up table 86 to put the results in the correct positions. In another embodiment the result position look-up table can be accomplished in the software of the controlling micro-processor.

It is therefore intended that the appended claims be interpreted broadly as covering all alterations and modifications which fall within the true spirit and scope of the invention.

What is claimed is:

1. Apparatus for detecting a leak position in a pipeline comprising:
   first sensor means for disposition at a first position on one side of a pipeline leak to detect sounds generated by the leak and operative to develop a first analog electrical signal corresponding to such sounds;
   second sensor means for disposition at a second position on the opposite side of the leak at a known distance from said first sensor means to detect sound generated by the leak and operative to develop a second analog electrical signal corresponding to such sounds;
   analog-to-digital converter means for converting said first analog signal to a digital signal including a series of first digital signal samples, and for converting said second analog signal to a digital signal including a series of second digital signal samples;
   first latch means for temporarily storing each said first signal sample;
   second latch means for temporarily storing each said second signal sample;
   memory means having a first sample storage channel coupled to said first latch means and operative to store the "n" most recent first signal samples each previously temporarily stored in said first latch means, and a second sample storage channel coupled to said second latch means and operative to store the "n" most recent second signal samples each previously temporarily stored in said second latch means, where "n" is a predetermined nonzero integer;
   multiplier means having a first input coupled to said first latch means and said first sample storage channel, and a second input coupled to said second latch means and said second sample storage channel;
   control means for causing said multiplier means to alternately multiply each first signal sample temporarily stored in said first latch means with each of the "n" samples stored in said second storage channel, and each second signal sample temporarily stored in said second latch means with each of the "n" samples stored in said first storage channel;
   accumulator means for accumulating the results of each said multiplication; and
   display means for displaying the accumulated results to indicate the position of said leak relative to the positions of said first and second sensor means.

2. Apparatus for detecting a leak in a piperline as recited in claim 1 wherein said memory means includes a random access memory device and associated latch means configured to operate as a first circulating delay forming said first sample storage channel and a second circulating delay forming said second sample storage channel.

3. Apparatus for detecting a leak in a piperline as recited in claim 1 wherein said multiplier means is a read-only memory device programmed to output a digital signal corresponding to the product of first and second digital signals input thereto.

4. Apparatus for detecting a leak in a piperline as recited in claim 1 wherein said accumulator means includes a random access memory, adder means having a first input coupled to the output of said multiplier means, a second input coupled to said random access memory, and an output coupled to said random access memory and to said display means.

5. Apparatus for detecting a leak in a piperline as recited in claim 4 wherein said control means includes address signal generating means for developing address signals for determining the memory locations within said random access memory and said memory means from which data is to be read and to which data is to be written.

6. Apparatus for detecting a leak in a piperline as recited in claim 2 wherein said multiplier means is a read-only memory device programmed to output a digital signal corresponding to the product of first and second digital signals input thereto.

7. Apparatus for detecting a leak in a piperline as recited in claim 7 wherein said accumulator means includes a random access memory, adder means having a first input coupled to the output of said multiplier means, a second input coupled to said random access memory, and an output coupled to said random access memory and to said display means.

8. Apparatus for detecting a leak in a piperline as recited in claim 7 wherein said control means includes address signal generating means for developing address signals for determining the memory locations within said random access memory and said memory means from which data is to be read and to which data is to be written.

9. A method for detecting a deal in a piperline comprising the steps of:
   positioning a first sensor means at a first position on one side of a piperline leak for detecting sounds generated by the leak and for developing a first analog electrical signal corresponding to such sounds;
   positioning a second sensor means at a second position on the opposite side of the leak at a known distance from the first sensor means for detecting sound generated by the leak and for developing a second analog electrical signal corresponding to such sounds;
   converting said first analog signal to a digital signal including a series of first digital signal samples, and for converting said second analog signal to a digital signal including a series of second digital signal samples;
   temporarily storing each said first signal sample and each said second signal sample in first and second latch means respectively;
   storing the "n" most recent first signal samples each previously temporarily stored in the first latch means in a first sample storage channel of a memory means, and storing the "n" most recent second signal samples each previously temporarily stored in the second latch means in a second sample storage channel of a memory means, where "n" is a predetermined nonzero integer;
   alternately multiplying each temporarily stored first signal sample by each of the "n" samples stored in the second storage channel, and each temporarily stored second signal sample with each of the "n" samples stored in said first storage channel;
   accumulating the results of each said multiplication; and
   displaying the accumulated results to indicate the position of the leak relative to the positions of the first and second sensor means.

* * * * *

UNITED STATES PATENT AND TRADEMARK OFFICE
CERTIFICATE OF CORRECTION

PATENT NO. : 5,205,173  
DATED : April 27, 1993  
INVENTOR(S) : Allen, Trevor J.

Page 1 of 2

It is certified that error appears in the above-indentified patent and that said Letters Patent is hereby corrected as shown below:

Column 1, line 35; delete "piperline" and substitute therefor --pipeline--.

Column 1, line 68; delete the comma (",") at the end of the line.

Column 4, line 5; delete "IMHz" and substitute therefor --1 MHz--.

Column 4, line 5; delete "1 16" and substitute therefor --116--.

Column 4, line 8; delete "IMHz" and substitute therefor --1 MHz--.

Column 6, line 29; delete "piperline" and substitute therefor --pipeline--.

Column 6, line 36; delete "piperline" and substitute therefor --pipeline--.

Column 6, line 41; delete "piperline" and substitute therefor --pipeline--.

Column 6, line 48; delete "piperline" and substitute therefor --pipeline--.

Column 6, line 55; delete "piperline" and substitute therefor --pipeline--.

Column 6, line 60; delete "piperline" and substitute therefor --pipeline--.

Column 6, line 67; delete "piperline" and substitute therefor --pipeline--.

UNITED STATES PATENT AND TRADEMARK OFFICE
CERTIFICATE OF CORRECTION

PATENT NO. : 5,205,173
DATED : April 27, 1993
INVENTOR(S) : Allen, Trevor J.

It is certified that error appears in the above-indentified patent and that said Letters Patent is hereby corrected as shown below:

```
    Column 7, line 7; delete "deal in a piperline" and
substitute therefor --leak in a pipeline--.
    Column 7, line 10; delete "piperline" and substitute
therefor --pipeline--.
```

Signed and Sealed this

Twenty-third Day of August, 1994

Attest:

BRUCE LEHMAN

Attesting Officer

Commissioner of Patents and Trademarks